US009913525B2

(12) United States Patent
Mine et al.

(10) Patent No.: US 9,913,525 B2
(45) Date of Patent: Mar. 13, 2018

(54) LIGHTWEIGHT SYSTEM FOR MOUNTING HAND-OPERATED TOOLS, OBJECTS, AND INTERACTION DEVICES TO A USER'S HAND

(71) Applicant: DISNEY ENTERPRISES, INC., Burbank, CA (US)

(72) Inventors: Mark R. Mine, Canyon Country, CA (US); Andrew M. Ogden, Altadena, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 191 days.

(21) Appl. No.: 14/745,579

(22) Filed: Jun. 22, 2015

(65) Prior Publication Data

US 2016/0367019 A1 Dec. 22, 2016

(51) Int. Cl.
*A45F 5/00* (2006.01)
*F16M 13/04* (2006.01)
*F16M 11/04* (2006.01)
*H04B 1/3827* (2015.01)

(52) U.S. Cl.
CPC .............. *A45F 5/00* (2013.01); *F16M 11/041* (2013.01); *F16M 13/04* (2013.01); *H04B 1/385* (2013.01); *A45F 2005/008* (2013.01); *A45F 2200/0516* (2013.01); *H04B 2001/3861* (2013.01)

(58) Field of Classification Search
CPC ....... A45F 2005/008; A45F 2200/0516; B43L 15/00
USPC .................................................. 224/217–218
See application file for complete search history.

(56) References Cited

U.S. PATENT DOCUMENTS

| 4,728,123 | A | | 3/1988 | Kassal et al. |
| 4,905,001 | A | | 2/1990 | Penner |
| 4,984,760 | A | * | 1/1991 | Cohn .................. F16M 13/022 248/126 |
| 5,286,228 | A | | 2/1994 | Lee et al. |

(Continued)

OTHER PUBLICATIONS

TFY, TFY Hand-Strap and CAse for iPhone 6 Plus, Retrieved from http://www.amazon.com/TFY-Hand-Strap-Case-iPhone-Plusidp/B00R2POWZ4/ref=sr_1_14?ie=UTF8&qid=142399761&sr=8-14&keywords=phone+hand+strap, Feb. 10, 2015.

(Continued)

*Primary Examiner* — Adam Waggenspack
(74) *Attorney, Agent, or Firm* — Marsh Fischmann & Breyfogle LLP; Kent A. Lembke

(57) ABSTRACT

An apparatus for supporting a hand-operated input device on a hand. The apparatus includes a first mounting member with a hoop-shaped body and a second mounting member with a semi-circular shaped body. At first and second ends, the second mounting member is rigidly coupled at spaced-apart first and second locations to the first mounting member. A device support is rigidly coupled to the first mounting member, and the device support is adapted for supporting a hand-operated input device. The first mounting member contacts the hand at first and second contact points, and the second mounting member contacts the hand at a third contact point. The first and second contact points are located on opposite sides of the hand between the knuckles and the heel of the hand, and the third contact point is on an opposite side of the hand from the first contact point and proximate to the heel.

20 Claims, 14 Drawing Sheets

(56) References Cited

U.S. PATENT DOCUMENTS

| | | | |
|---|---|---|---|
| 5,542,588 A * | 8/1996 | Sison | B43L 15/00 |
| | | | 15/443 |
| 5,764,164 A | 6/1998 | Cartabiano et al. | |
| 5,796,354 A | 8/1998 | Cartabiano et al. | |
| 6,042,555 A | 3/2000 | Kramer et al. | |
| 6,325,522 B1 | 12/2001 | Walian | |
| 6,360,928 B1 * | 3/2002 | Russo | A45F 5/00 |
| | | | 224/218 |
| 6,850,224 B2 | 2/2005 | Baughman | |
| 7,800,592 B2 | 9/2010 | Kerr et al. | |
| 7,942,293 B2 * | 5/2011 | Lawrence | A45C 11/008 |
| | | | 224/197 |
| 8,125,448 B2 | 2/2012 | Ranta et al. | |
| 8,424,768 B2 | 4/2013 | Rueblinger | |
| 8,561,862 B2 | 10/2013 | Foggiato | |
| 8,570,273 B1 | 10/2013 | Smith | |
| 8,690,211 B2 | 4/2014 | Potter et al. | |
| 8,708,825 B2 | 4/2014 | Crisco, III | |
| 8,833,820 B1 * | 9/2014 | Hill | G06F 1/1628 |
| | | | 224/218 |
| 8,950,638 B2 | 2/2015 | Wangercyn, Jr. et al. | |
| 9,138,043 B1 * | 9/2015 | Meier | A45F 5/10 |
| 2002/0140674 A1 | 10/2002 | Okuno et al. | |
| 2004/0250329 A1 * | 12/2004 | Rickert | A45F 5/102 |
| | | | 2/16 |
| 2006/0088361 A1 * | 4/2006 | Nakhaie | B43K 5/005 |
| | | | 401/6 |
| 2007/0018062 A1 * | 1/2007 | Calinescu | F16M 11/043 |
| | | | 248/220.21 |
| 2010/0012813 A1 * | 1/2010 | Mickel | A47G 1/24 |
| | | | 248/495 |
| 2012/0085797 A1 * | 4/2012 | Paez | A45F 5/00 |
| | | | 224/219 |
| 2012/0266358 A1 | 10/2012 | Yuen | |
| 2013/0240580 A1 * | 9/2013 | Yu | A45F 5/00 |
| | | | 224/217 |
| 2013/0295549 A1 | 11/2013 | Hills | |
| 2014/0035884 A1 * | 2/2014 | Oh | G06F 3/03545 |
| | | | 345/179 |
| 2014/0274397 A1 | 9/2014 | Sebastian | |
| 2014/0291172 A1 | 10/2014 | Rogers | |
| 2014/0374451 A1 | 12/2014 | Coleman | |
| 2015/0022446 A1 | 1/2015 | Asplund | |
| 2015/0335137 A1 * | 11/2015 | Perry | A45F 5/00 |
| | | | 224/218 |

OTHER PUBLICATIONS

Love Handle, Love Handle As Seen on TV, Retrieved on Feb. 10, 2015 from http//www.amazon.com/Love-Handle-SEen-Compatible-E-Readers/dp/B00NNZCVHO/ref=sr_1_2?ie=UTF8&qid=1423613703&sr=8-2keywords=grip+phone, Feb. 10, 2015.

Lazy Hands, Retrieved on Feb. 10, 2015 from http://sportsheadphonesbluetoothsweatproof.skorluoyunlar.net/lazy-hands-phone-grip-fits-most-black-b007o354am.html, Feb. 10, 2015.

* cited by examiner

LIGHTWEIGHT SYSTEM FOR MOUNTING HAND-OPERATED TOOLS, OBJECTS, AND INTERACTION DEVICES TO A USER'S HAND

BACKGROUND

1. Field of the Description

The present description relates, in general, to handheld input devices such as smartphones and, more particularly, to a system for use in supporting handheld or hand-operated tools, objects, and interaction devices (often grouped together as handheld or hand-operated "input devices" herein) on a user's hand so as to reduce physical strain on the user and also to improve ease of use or operation of the hand-mounted input device.

2. Relevant Background

There is a growing trend towards the use of small handheld and hand-operated devices. For example, there has been a widespread adoption of smartphones and handheld tablets for interacting with digital data and for use in communicating with others with such devices. Many of these devices are used as input devices, e.g., to interact with an application (or "app") running on the device, for communicating with others by sending text messages (or texting), and so on. The users of these hand-operated devices generally have to hold or grip the device in one hand while operating the device, e.g., interacting with buttons, sliders, and the like, on a touchscreen, with the other hand. Extended use of handheld and hand-operated devices can cause physical strain on the user's fingers, hand, and arms and limits the use of the hand gripping the device from other tasks (e.g., difficult to use fingers with other input devices when gripping the handheld device).

Extended and repeated use of hand-operated input devices may be useful in many applications. As one example, virtual reality (VR) rooms have been developed that utilize immersive three dimensional (3D) projection and other techniques to allow a user to experience a virtual world such as for VR gaming. Also, it is becoming more common for designers to utilize immersive 3D VR to do real world modeling. In these and other settings, it often is desirable for the user to comfortably hold an interaction or input device for a long period of time such as to play a game or to do design or other real world work, and it may be useful for the user to be able to move their arms and hands around to interact with the virtual environment, which is difficult if gripping a larger device or performing acts that require two hands.

Holding conventional input devices such as joysticks, game controllers, smartphones, tablets, and the like for extended periods often results in fatigue and hand discomfort. These problems are due to the requirement that the user grasp or hold the input device and also due to the resulting complicated, awkward, and/or restricted range of movement of the user's or operator's thumb and fingers while they try to operate the specific controls interface (e.g., to interact with a touchscreen with the thumb of the hand gripping the device). As a specific example, smartphones require a user to grasp the device at the same time they provide movements to navigate the digital interface of specific applications, and this requires constant visual confirmation by the user to make sure that their thumb or finger is providing tactile inputs that are registered to the appropriate control areas depicted by images presented on the display (e.g., is their thumb actually over an input button on the touchscreen).

Some efforts have been made to allow a user to use a handheld or hand-operated device in a hands free manner, but these efforts have not been wholly successful. Several designs call for straps or bands that slide over the user's fingers. This reduces the amount of effort it takes to hold the device, but the user typically still is required to grip or steady the device with their fingers and to operate the device with their other hand. Such a design is undesirable in some applications as it can require two hands to provide input and ties up the user's fingers on the hand wearing the finger strap-based device such that it is difficult to use these fingers for interacting with other devices or even with the supported/held device. Hence, these products make it easier to hold a device for longer periods of time which may be useful when the device is being used as a communication device (e.g., a cellphone), but the problems associated with interacting with the devices to provide input remain.

SUMMARY

Briefly, the inventors designed a handwear device or lightweight mounting system for mounting hand-operated tools, objects, and interaction devices (or more simply "hand-operated devices," "hand-operated input devices," or the like) such as smartphones, tablets, and other small electronic devices. The mounting system addresses the previously discussed problems with extended use of a handheld and/or hand-operated device including physical strain, leaving the user's hands and/or fingers free for other purposes, and registering a user's hand, fingers, and/or thumb with input devices without the need for continuously looking at input elements of the hand-operated device to insure proper alignments (e.g., the user's thumb is properly and repeatedly aligned for contacting a button or slider on a touchscreen or other input element or mechanism on a surface of the hand-operated input device).

The lightweight mounting system is adapted for effective suspension and location of hand-operated input devices from the "body" of the hand (e.g., relative to or over the carpal and metacarpal area and the tissue/muscles over the carpals and metacarpals). In some embodiments, the mounting system includes a first mounting member that is hoop shaped and extends about the body of the hand to provide a pair of contact points (e.g., first and second contact points) between the first mounting member and the outer portions of the body of the hand at two spaced apart locations each immediately below (or proximate to, such as within 0.5 inches and more typically within 0.25 inches) the knuckles (or metacarpophalangeal joints). The mounting system may also include a second mounting member that is U-shaped and attached at opposite ends to first and second connectors provided on the first mounting member. When the mounting system is worn by a user on their hand, the second mounting member extends away from the fingers over the body of the hand to provide a third contact point for the mounting system between the second mounting member and the outer portions of the body of the hand at a location on or adjacent the heel of the hand opposite the user's thumb.

A device support is rigidly affixed to the one of the connectors, which, when the system is worn, is positioned over a center area of the user's palm. The device support may be L-shaped, with first and second support arms mating at a 90-degree or other shaped corner, such that the second support arm extends outward from the user's palm a desired distance (which can be chosen to suit the size, e.g., width, of the hand-operated input device). The hand-operated device is attached to the second support arm of the device support such that the hand-operated device also extends outward from the user's palm. In some cases, the hand-operated input device is planar and extends outward orthogonally to a plane including the body of the hand (when outstretched, for example, the hand is generally planar) with a first surface facing toward the user's thumb and a second surface facing toward the user's fingers. In this manner, input elements on the first surface can be accurately registered to the user's thumb and input elements on the second surface can be accurately registered to the user's fingers to facilitate ready interaction with the user to provide inputs on both sides of the hand-operated input device (sequentially or concurrently) without the device rotating or pivoting in an undesirable manner and without requiring the user to grip or otherwise support the hand-operated input device.

The mounting system provides effective suspension and location of the hand-operated device from the body of the hand, e.g., the hand-operated input device is not in contact with the user's hand when "worn" or supported by the mounting system but, instead, may be spaced apart from the palm some desired distance such as 0.25 to 0.5 inches or more to achieve proper registration with input elements on the device and the user's thumb or fingers. The mounting system provides for optimal dexterity of the user's hand (thumb and fingers are not used for gripping) and manipulation by the human hand of the hand-operated input device (and other non-worn devices, in some cases). Effective suspension is achieved through a design of specific shapes and materials that register to specific features of the human hand physiology (e.g., via the at least three contact points). The mounting system achieves performance attributes that would be desirable and of benefit to users. For example, the design allows for easy ingress and egress (e.g., the system is easy to put on and take off the user's hand), repeatable and high-resolution user registration for heads up operations, and optimal free movement and dexterity of the thumb and fingers on the hand wearing the mounting system to operate mechanisms or create input movements for the operation of digital interactive interfaces such as touchscreens, trackpads, and push buttons (triggers). Because the hand-operated input device is suspended from the user's hand (and not gripped), the user's hands are free to operate other control interfaces such as keyboards and doorknobs without having to set down or put away the hand-operated input device.

More particularly, an apparatus or system is provided for supporting a hand-operated input device on a user's hand. The apparatus includes a first mounting member with a hoop-shaped body and a second mounting member with a semi-circular shaped (or U-shaped) body having a first end and a second end. The first and second ends are rigidly coupled at spaced-apart first and second locations to the hoop-shaped body of the first mounting member (such as with first and second connectors). The apparatus also includes a device support rigidly coupled to the hoop-shaped body of the first mounting member, and the device support is adapted for mating with and supporting a hand-operated input device.

In some embodiments, the device support includes a first support arm extending from a first end outward from the hoop-shaped body of the first mounting member and a second support arm mating with a second end of the first support arm distal to the hoop-shaped body. The second support arm may include a mounting surface for receiving the hand-operated input device. In these embodiments, the first support arm may have a length of at least 0.5 inches, and the first and second support arms meet at a corner defining an angle in the range of 70 and 110 degrees (with 90 degrees being useful in some cases). In practice, the first end of the first support arm can be coupled to the hoop-shaped body of the first mounting member at or proximate to the first location to provide registration.

To provide a stable base for the suspended input device when the apparatus is worn on a hand, the hoop-shaped body of the first mounting member may contact the hand at first and second contact points and the semi-circular shaped body of the second mounting member may contact the hand at a third contact point. The first and second contact points can be located on opposite side of a body of the hand between the knuckles and the heel of the body of the hand, and the third contact point is spaced apart from the second contact point on an opposite side of the body of the hand from the first contact point and proximate to the heel of the hand. To provide good gripping and user comfort as well as a stable base, the bodies of the first and second mounting members may include a stiff inner core formed of plastic or metal and an outer contact surface layer covering the stiff inner core formed of a soft plastic or a rubber.

DETAILED DESCRIPTION OF THE PREFERRED EMBODIMENTS

Briefly, the present description is directed toward a handwear device or mounting system for suspending a hand-operated input device (such as a smartphone, a small tablet, an electronic input apparatus, and the like) from a user's hand. The mounting system was developed in part because the inventors were exploring ways to improve virtual reality (VR) interaction techniques and immersive three-dimensional (3D) modeling. Particularly, the inventors were searching for ways that a user could comfortably hold an interaction device for a long period of time in order to do real world work (e.g., to do design work using immersive 3D modeling) or to game or otherwise participate in a VR environment.

It was recognized that holding conventional input devices (e.g., joysticks, game controllers, smartphones, and the like) for extended periods of time often resulted in fatigue and hand discomfort. There was a need for input devices that a user could manipulate easily without straining their hands. It was also desirable for the user to be able to interact with a touchscreen and with buttons (or triggers or other input elements, which may be thought of as first and second input elements) on opposite surfaces of the hand-operated input device without having to continually look at the device to assure proper alignment/registration with their thumb and fingers.

Figure 1:
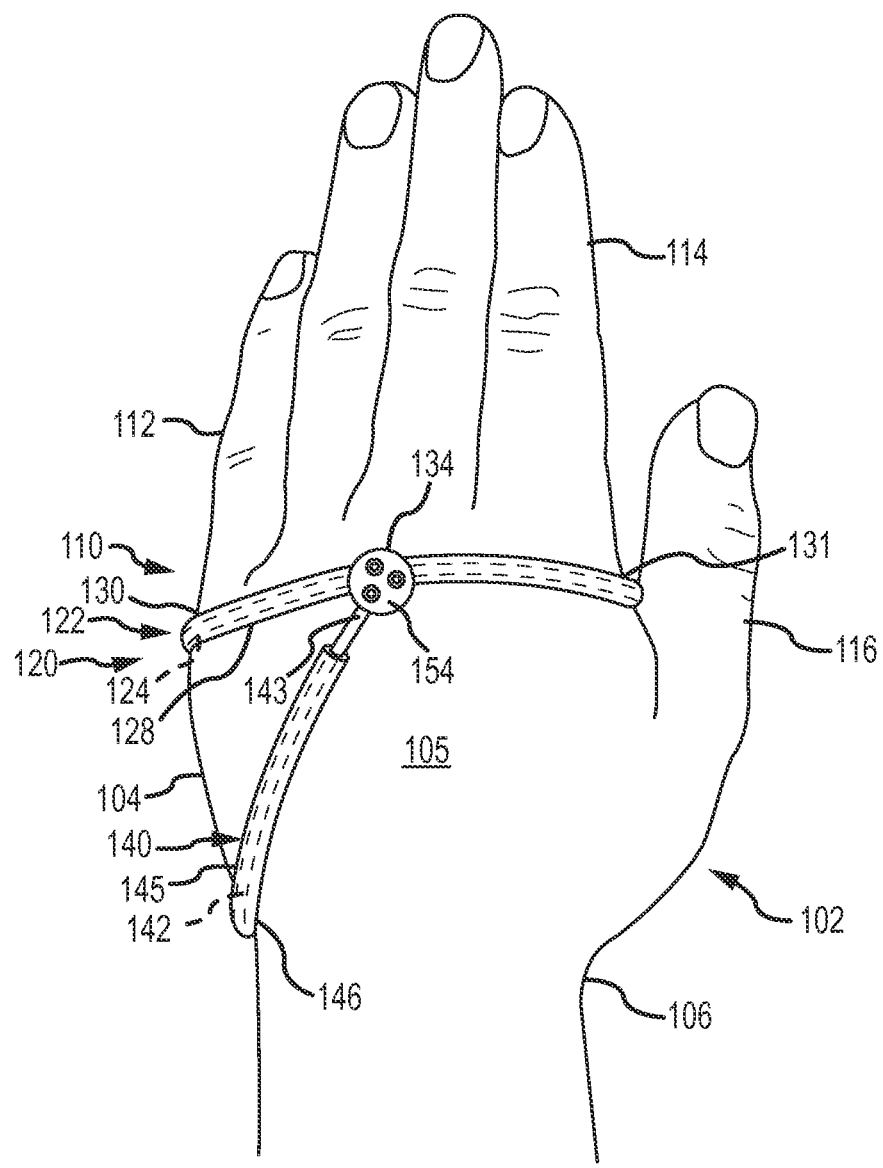
FIG. 1 illustrates, with a top view of a user's hand, a hand-operated device mounting assembly or system during its use or when it is being worn by a user or device operator.

FIG. 1 illustrates one embodiment of a lightweight mounting system 120 being worn on a hand 102 of a user/operator (who is a user such that the hand 102 is a human hand, with the left hand being shown in this example but the system 120 can also be worn on the right hand of a user). FIG. 1 shows the user's hand from above or showing the posterior part of the hand (or back of the hand or the dorsal or opisthenar area). Prior to discussing the mounting system 120 in detail, it may be useful to describe the physiology of the hand 102 as it relates to use (wearing) the mounting system 120. As shown, the user's hand 102 includes a body 104 that includes the metacarpals, carpals, and tissue/muscle over these hand bones, with FIG. 1 showing the back 105 of the hand 102 (which may also be known as the opisthenar area, dorsal area, or posterior area of the hand 102). The user's hand 102 is coupled to a wrist 106 and includes digits including a pinky/little finger 112, an index/fore finger 114, and a thumb 116. The body 104 of the hand includes tissue in the valley 118 between the thumb 116 and index finger 114, and the fingers including fingers 112, 114 are coupled to the body 104 of the hand 102 at a set of metacarpophalgeal joints or knuckles 110.

The mounting system 120 as shown in FIG. 1 includes a first mounting member 122 that is hoop or circular shaped. As shown, the mounting member 122 has a tubular body (e.g., a body with a circular cross sectional shape) that is made up of an inner core 124 over which is provided an outer contact surface layer 128. It is desirable for the first mounting member 122 to be relatively rigid to retain its shape and strong but with some flexibility for conforming to the user's hand 102. To this end, the inner core 124 may be formed from a rod of relatively stiff material such as plastic, ceramic, or metal (e.g., aluminum, steel, or the like) with a relatively small outer diameter (OD) such as a 0.1 to 0.25-inch OD or the like. The outer contact surface layer 128 may be provided with a tube or tubing of a softer material, such as a plastic or a rubber (e.g., a latex such as used in surgical tubing), with an inner diameter (ID) matching or slightly larger than the OD of the core 124. A softer, pliable material is used for the outer contact surface layer 128 for user comfort and for better gripping of the user's skin (e.g., higher friction than a smooth rigid surface of the inner core 124).

The first mounting member 122 is configured such that it provides first and second contact points 130, 131 when the mounting system 120 is worn on the hand 102 as shown. In the embodiment of FIG. 1, the first mounting member 122 is hoop/circular shaped with an ID that is chosen (e.g., custom fit/sized or the system 120 may be size adjustable or tightenable by adjusting this ID, which may be measured prior to the user wearing the system 100 or after the system 100 is put on (e.g., with the member 122 taking a more oval shape)) based on the width of the body 104 of the user's hand 102. Particularly, the first and second contact points 130, 131 are at locations on the outer portions of the body 104 immediately below the knuckles 110 (e.g., with contact point 130 adjacent the knuckle of the small finger 112 on the body 104 and with contact point 131 adjacent the knuckle of the index finger 114 on the body 104 and in the valley or hand surface area 131 between the finger 114 and the thumb 116), such as 0.1 to 0.5 inches below the knuckles 110 (with 0.1 to 0.25 inches being one desirable location range for the contact points 130, 131 from the respective knuckles 110). The ID of the first mounting member 122 may be smaller (e.g., 0.1 to 0.25 inches less) than the width of the knuckles 110 (with the hand in a flat and/or relaxed pose or state).

Figure 2:
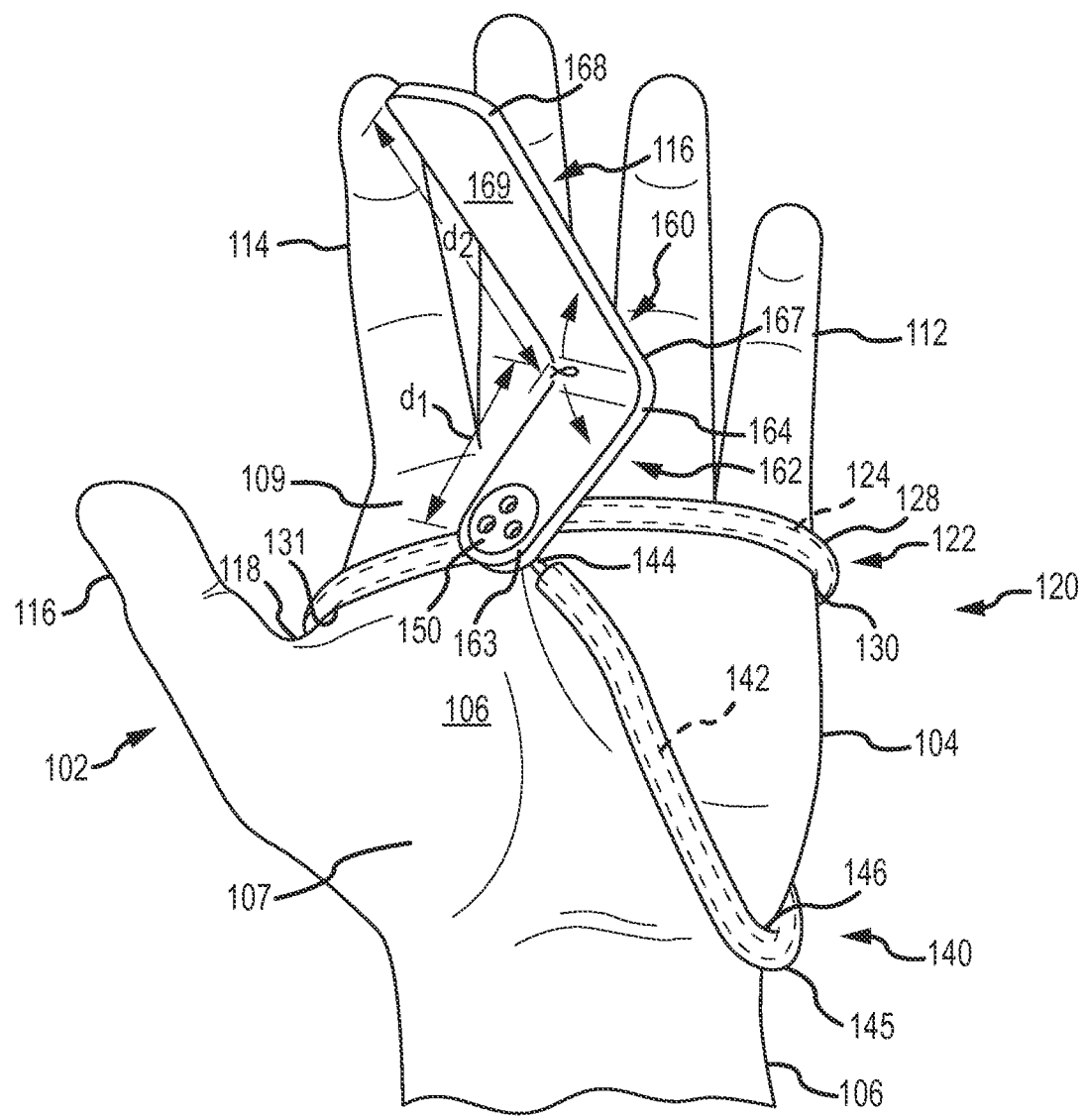
FIGS. 2 and 3 are bottom or palm views (from two differing viewing angles) of the user's hand of FIG. 1 showing additional features of the hand-operated device mounting assembly or system, including a device support (prior to attachment of a hand-operated device)

The mounting system 120 further includes a second mounting member 140 that may take the same form as the first mounting member 120 with a tubular body that is formed of an inner core 142 (e.g., a plastic or metal rod) with an outer contact surface layer 145 (e.g., a latex tube or tubing formed of another material with an ID selected for receiving the inner core 142). The second mounting member 140 is U-shaped (or semi-circular shaped) and is mated with the first mounting member 122 at a first end 143 (and also at a second end 144 as shown in FIG. 2). The location 134 of this coupling may vary, but one useful embodiment (as shown) provides the coupling at a position relative to the hand 102 between the ring and middle finger (or, more accurately, the metacarpals associated with these two fingers).

The coupling is rigid between the two mounting members 122, 140 (e.g., such that the coupling location does not change) and is provided with a first connector 154. The first mounting member 122 may be slid through a connection element, which then is tightened to the outer layer 124 such that the connector 154 is supported upon the first mounting member 122. The connector 154 is adapted, such as with another connection element, for receiving and retaining an end 143 of the second mounting member 140 (e.g., an end of the inner core 142).

As shown, the second mounting member 140 has a length chosen such that the member 140 can be spaced apart a distance (e.g., 1 to 4 inches with 2 to 3 inches being a common range) from the first mounting member 122 in a section used to mate with the user's hand 102. Particularly, the second mounting member 140 is useful for providing a more stable base in the system 120 by providing a third contact point as shown at 146 with the member 140 (or its outer contact surface layer 145) abutting the body 104 of the hand 102. The location of the third contact point 146 is on or below (closer to the wrist 106) the heel (item 107 in FIG. 2) of the hand 102 (e.g., the area anteriorly to the bases of the metacarpal bones located in the proximal part of the palm 106) on the same side of the body 104 as the small finger 112 (or opposite the thumb 116). The three contact points (minimum) are arranged, in this way, in a triangle that is useful for resisting rotation of the system 120 and any supported/suspended hand-operated input device (not shown in FIG. 1) when a user applies forces on the device with their thumb 116 and/or fingers 112, 114.

Figure 3:
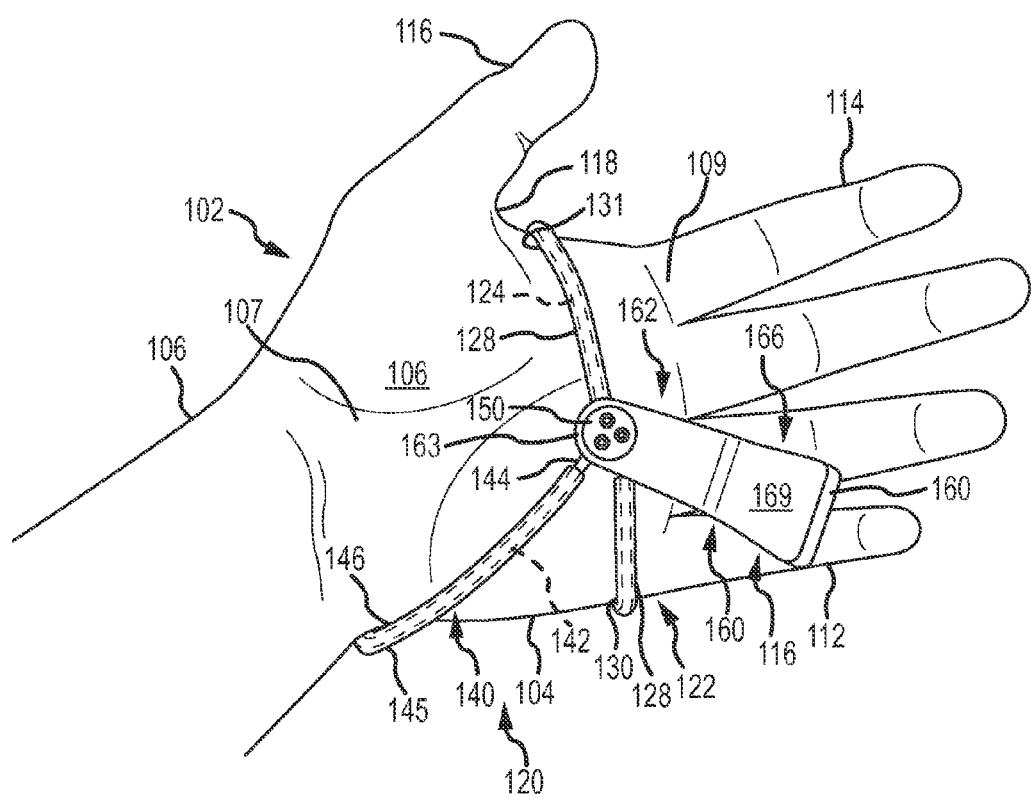

FIGS. 2 and 3 illustrate the mounting system 120 being worn by a user showing relative positioning of its components to the front side of the hand 102. From this view, the user's hand 102 is shown to include a palm 106 (which is the central region of the anterior part of the hand 102 located superficially to the metacarpal bones) and a heel 107 (which is the area anteriorly to the bases of the metacarpal bones located in the proximal part of the hand). Further, the body 104 of the hand 102 includes a palm side area 109 of the knuckles 110 (or area of body 104 located anteriorly to the metacarpophalangeal joints where the digits meet the palm 106).

As shown, the first mounting member 122 extends fully around the body 104 just below the knuckles 110 and the related palm side area 109 of the knuckles. The first mounting member 122 contacts the body at first and second contact points 130, 131. Further, the second mounting member 140 extends from the back 105 of the hand 102 around to the palm 106. It contacts the body 104 at third contact point 146 on or below the heel 107 and extends upward across the palm 106 to mate or couple at a second end 144 (e.g., an end of the inner core 142) with the first mounting member 122. This mating is rigid and is provided by a second connector 150, which may take a form similar to that of connector 154, that is adapted to be mounted on and supported by the first mounting member 122 and to receive and retain the end 144 of the second mounting member 140. The coupling provided by connector 150 is rigid such that the connector 150 does not slide on the first mounting member 122 and the end 144 of the second mounting member 140 does not rotate or move relative to the member 122.

The mounting system 120 further includes a device support 160 adapted for supporting a hand-operated input device (not shown in FIGS. 1-3) so as to be suspended a distance (e.g., 0.2 to 1 inch or more) away from the palm 106 and inner knuckle area 109 (e.g., the device, when mounted in the system 100 may extend away from the palm 106 generally along a plane passing through the knuckles 110). The location and configuration of the device support 160 is chosen to register two surfaces (e.g., front and back surfaces) of a hand-operated input device with the thumb 116 and the fingers, respectively. Further, the device support 160 rigidly supports the device such that the user's hand 102 can be used to provide input to two surfaces or input elements on such surfaces (e.g., front and back surfaces of a smartphone) without pivoting or rotating.

To this end, the device support 160 is shown to have an L-shaped body formed from a first support arm 162 and a second support arm 166 meeting at an angled corner (e.g., an angle, $\theta$, of 70 to 110 degrees with 90 degrees used in some embodiments). The first support arm 162 is rigidly coupled with the second connector 150 at a first end 163 and with an end 167 of the second support arm 166 (to form the angled corner). The first support arm 162 extends from the first mounting member 122 (such as in an orthogonal manner or at an angle of 15 to 45 degrees with the offset angle being about 20 degrees in the system 120 of FIGS. 2 and 3) toward the fingers and/or away from second mounting member 140 a distance, $d_1$, as measured from the end 163 to the end 164. The length of the arm or distance, $d_1$, is chosen to provide a desired location of the second support arm 166 and a hand-operated input device later attached to mounting surface 169 of this arm 166 and may be in the range of 0.25 to 1.25 inches based on the location of the connector 150 relative to the palm 106, the size of the user's hand 102, and length/flexibility of the thumb 116 (to register a device surface with the thumb 116), and other design parameters. The second support arm 166 has a length, $d_2$ (e.g., 0.5 to 6 inches with 1.5 to 3 inches being useful in many applications) as measured from end 167 to end 168 that defines the size of the mounting surface 169, which can be sized/shaped to suit a particular hand-operated input device.

Figure 4:
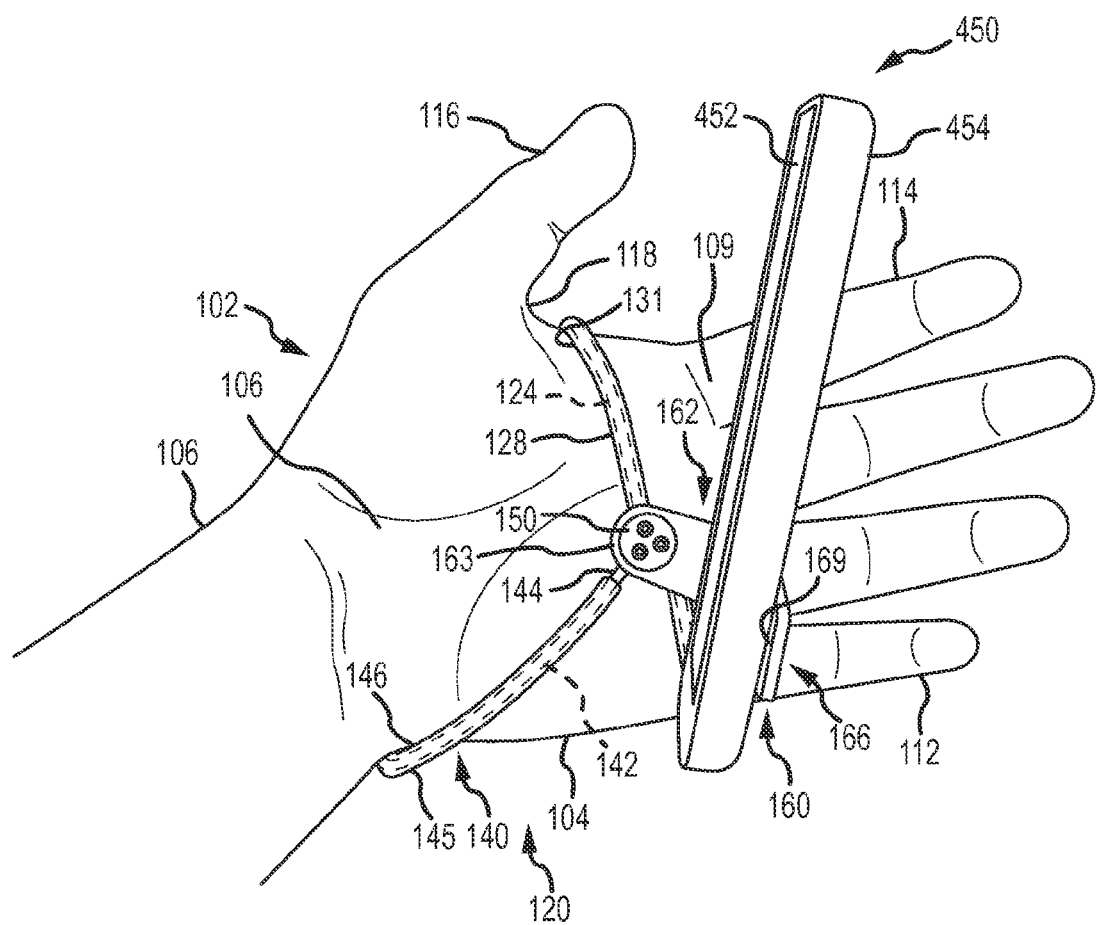
FIG. 4 illustrates, from the palm side of the user's hand, the hand-operated device mounting assembly or system of FIGS. 1-3 while it is being worn by user, with a hand-operated device attached to the device support, and with the fingers and thumbs outstretched to show the fingers-free (including also the thumb) mounting provided by the hand-operated mounting assembly or system.

FIG. 4 illustrates the mounting system 120 of FIG. 1-3 being worn on hand 102 from the palm side after a hand-operated input device 450 has been attached to mounting surface 169 of the second support arm 166. The device 450 may be attached in a wide variety of ways such as with Velcro or similar pads, with mechanical fasteners, and the like. The device 450 is shown to be attached to the second support arm 166 via its back surface 454 (or second surface) with its front surface 452 (or first surface) facing the palm 106 and thumb 116. The attachment area on back or second surface 454 of the device 450 is chosen to register user input elements (not shown in FIG. 4 but may include portions of a touchscreen, buttons/triggers, a joystick, and the like) on front or first surface 452 with the user's thumb 116 (or its ready movement range) and user input elements on back or second surface 454 with the user's fingers (which fingers will depend upon the particular input elements).

As shown, the hand-operated input device 450 is fully supported by the mounting system 120 and the user does not have to use their thumb 116 or fingers (including fingers 112, 114) to grip or hold the device 450. In this way, the mounting system 120 may be considered a fingers-free support device or apparatus. The input device 450 is suspended (e.g., a distance from the palm 106) and is arranged to extend outward (e.g., orthogonally) from the palm 106 of the hand 102 such as generally along a plane extending through the user's knuckles 110.

Figure 5:
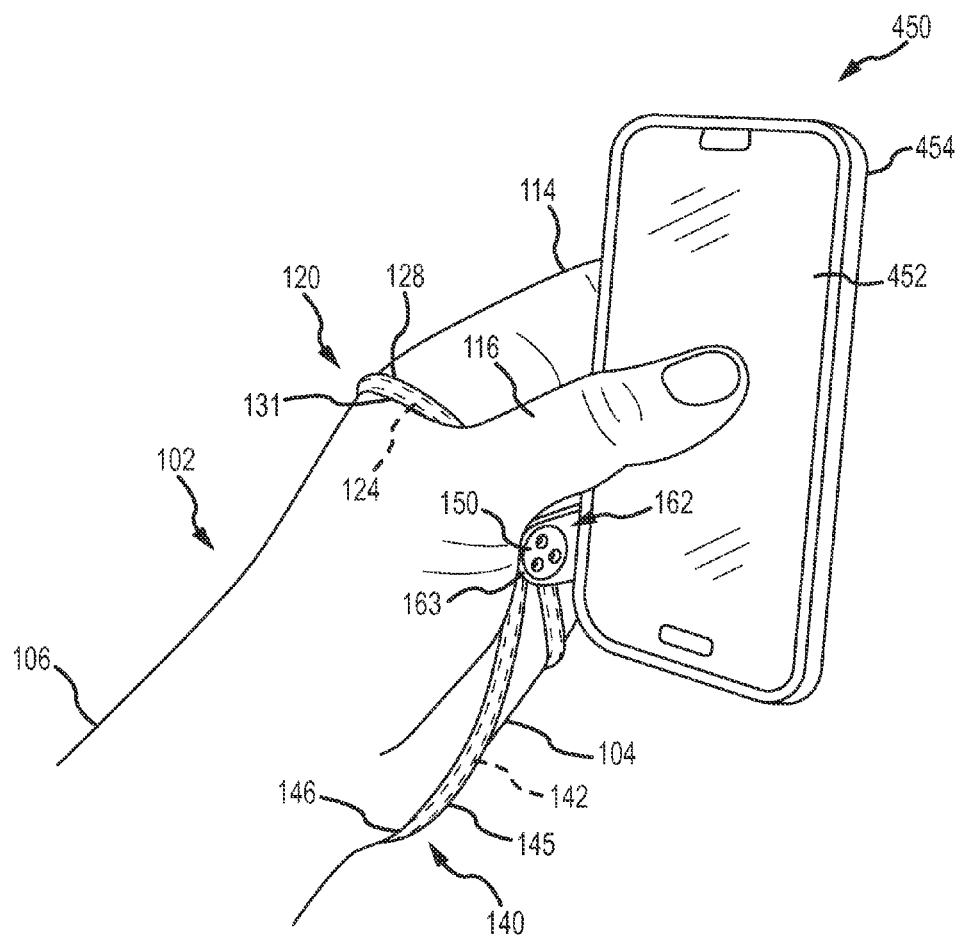
FIG. 5 shows, with a perspective, palm-side view, the hand-operated device mounting assembly or system of FIGS. 1-3 with a view similar to that of FIG. 4 but with the user's thumb contacting or interacting with a first or front surface of the hand-operated device (e.g., a user interface to an application provided on a touchscreen) showing accurate and repeatable registration of the thumb to the first surface (or first input elements of the hand-operated device)

FIG. 5 illustrates the mounting system 120 as shown in FIG. 4 to suspend and locate/register the input device 450 while the user is moving their hand 102 to provide input or to interact with the input device 450. Particularly, the thumb 116 has been moved so as to be in contact with the first or front surface 452 of the input device 450, and a user interface to an application may be provided via a touchscreen to provide an input element/mechanism on this surface 452. As can be seen, the user's thumb can readily reach the surface 452 and any input elements provided thereon and is registered to its location relative to the user's hand 102 such that input can be provided without looking to verify the location of their thumb 116 relative to the surface 452 and device 450. The rigid support provided by the device support 160 when combined with the three contact points 130, 131, and 146 (arranged in a triangular pattern) provides a stable base such that when the thumb 116 applies force against the surface 452 the device 450 does not rotate or pivot away from the thumb 116.

Figure 6:
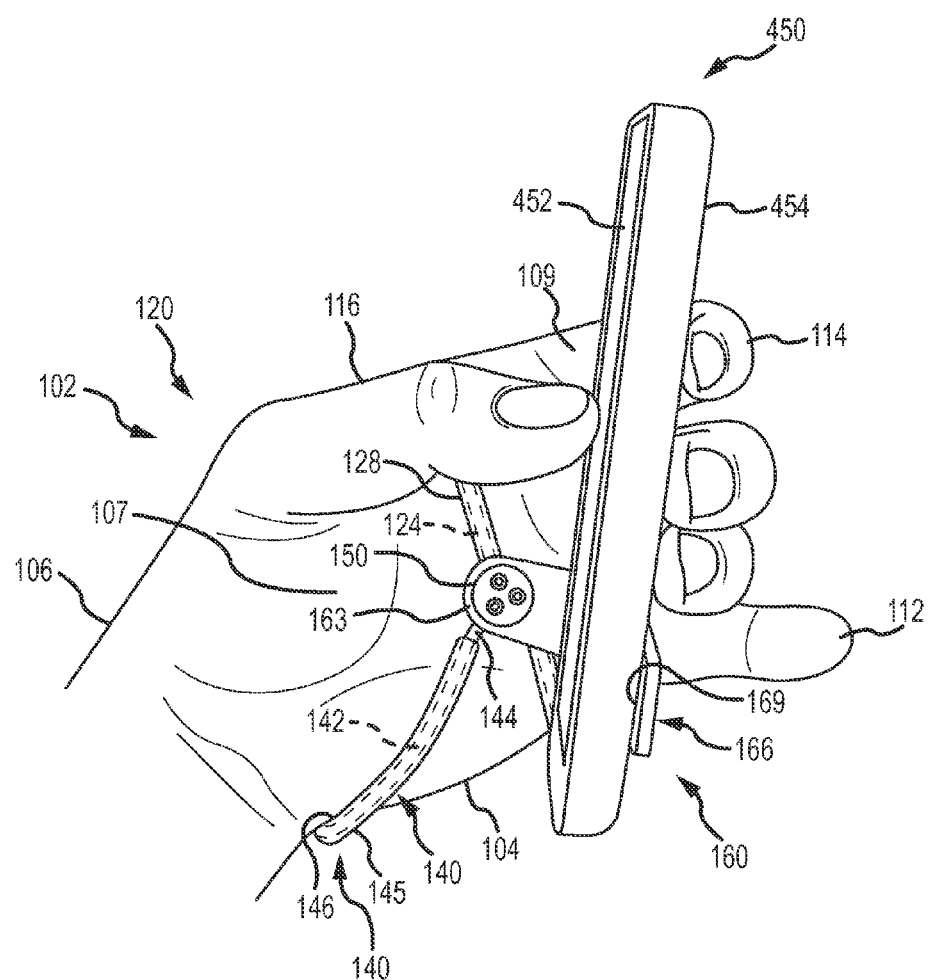
FIG. 6 provides a side view of hand-operated device mounting assembly or system similar to that of FIG. 5 but showing both the front and back surfaces of the hand-operated device which may both include input elements (first input elements and second input elements) that may be concurrently operated by the user due to the proper registration of the front and back surfaces to the thumb and the fingers of the user and due to the rigidness of the device support that limits (or eliminates) pivoting and/or rotation of the hand-operated device during input operations.

FIG. 6 provides another view of the mounting system 120 of FIGS. 1-5 as it is being used by an operator/user to concurrently enter input on both the front/first surface 452 (or input elements thereon) and the back/second surface 454 (or input elements thereon). As shown, the user's thumb 116 is free to move and is registered with a portion of the front/first surface 452 (where input elements can be provided), and, concurrently, the user's fingers are free to move (not needed for gripping) and are properly registered with portions of the back/second surface 454 (where input elements can be provided). With the rigid support provided by the device support 160 and mounting members 122, 140 providing contact points 130, 131, 146, the input device 450 does not move relative to its support/suspension location relative to the user's hand 102 (such as relative to the user's palm 106 and/or knuckles 110). The user can also interact with the input device 450 to provide input only with the fingers via back/second surface 454 and no rotation/pivoting occurs even without the thumb 116 providing an opposing pressure.

Figure 7:
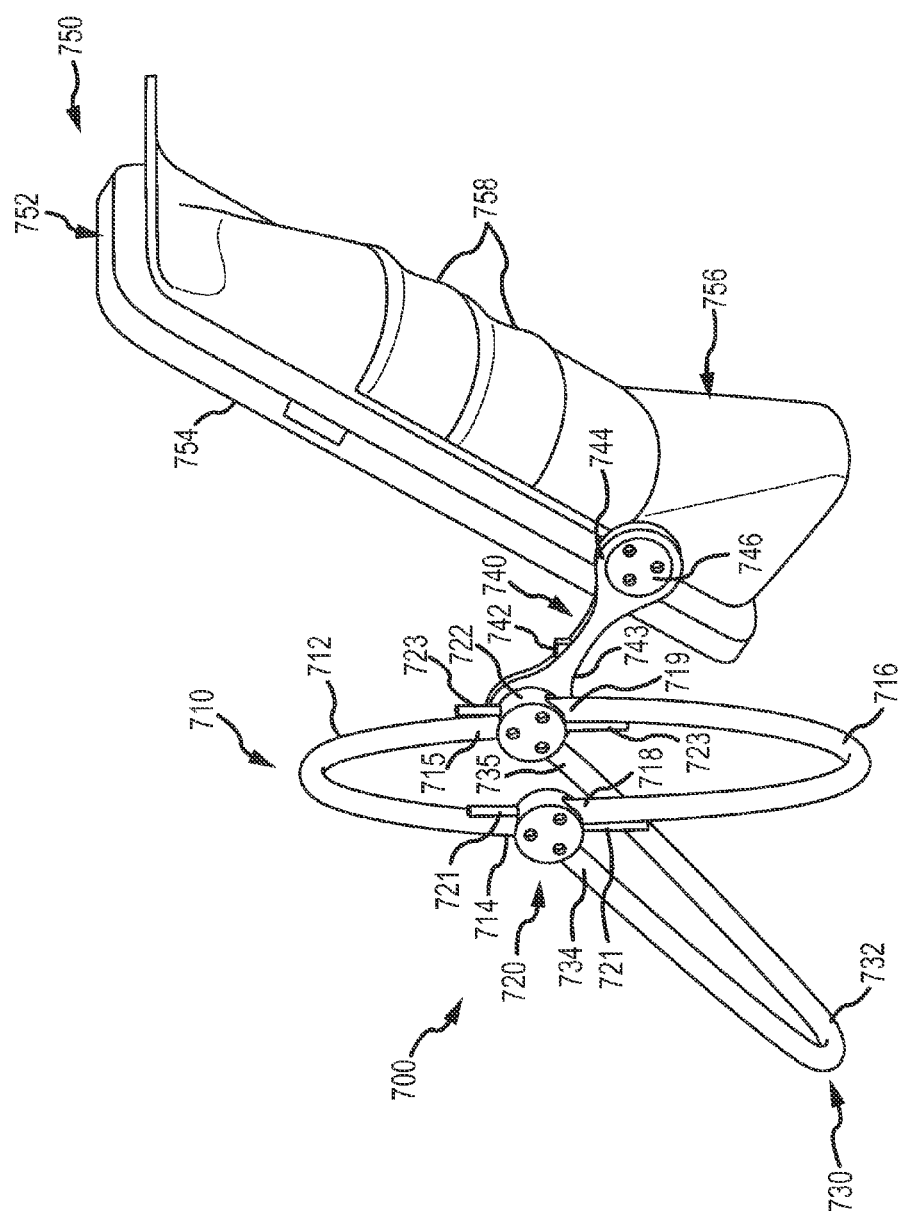
FIG. 7 is a rear perspective view of another hand-operated device mounting system of the present description and shows a hand-operated or interactive device attached to the device support.

FIG. 7 illustrates another embodiment of a lightweight mounting system 700 for use in supporting or mounting a hand-operated input device 750 to a user's hand (left or right, with the configuration adapted for use with a right hand). The input device 750 is similar to the device 450 of FIG. 1-6 in that it includes an electronic communication or interaction device 752 with a first side or surface 754 that may be used to present input elements such as a touchscreen operated to provide a user interface to one or more software applications running on or by the device 752. Further, though, the hand-operated input device 750 is shown to include a second surface (or input add-on component) 756 opposite the first surface 754 that includes input elements 758 in the form of buttons or triggers that may be operated (e.g., by the users fore finger and middle finger or other fingers) to interact with (provide user input to) the electronic interaction device 752 or otherwise provide user input.

The mounting system 700 includes a first mounting member 710 and a second mounting member 730 that act in combination to provide at least three contact points with a user's hand to minimize slippage and pivoting/rotation on the hand during user input on the input device 750. To this end, the first mounting member 710 again has a body with that is hoop or circular shaped to fully encircle the user's hand (e.g., about or just palm-side of the user's knuckles). In contrast to the mounting system of FIGS. 1-6, though, the first mounting member 710 is a two-part configuration with a first tubular member 712 and a second tubular member 716 that may be made up of a core and outer layer as shown in FIG. 1-6 or may be a unitary design (e.g., a tube or rod of a desired material with a useful stiffness to retain its shape while still providing some flexibility).

The first and second tubular members 712, 716 are semi-circular or U-shaped and have their ends 714, 715 and 718, 719, respectively, coupled together with first and second connectors 720, 722 to form the hoop or circular-shaped body of the first mounting member 710. The system 700 further includes stiffeners 721, 723 extending outward from each side of the connectors 720, 722 to run a length along the ends 714, 715, 718, 719 so as to provide additional support for the tubular members 712, 716 and limit bending or flexing at least in the region near the connectors 720, 722.

The mounting system 700 further includes the second mounting member 730 that has a U-shaped (or semi-circular-shaped) body provided by a tubular member 732. The tubular member 732 again may be a one-piece design, include a core member and outer contact surface layer (as shown in FIGS. 1-6), or include more than two layers/component parts. The ends 734, 735 of the tubular member 732 are received and rigidly retained by connectors 720, 722, respectively. To achieve a triangular arrangement of the three contact points provided by the mounting system 700, there is an angle defined between the tubular member 732 and the tubular member 716 of the first mounting member 710 (near where the ends are coupled to connectors 720, 722). This angle typically will be in the range of 30 to 70 degrees with some embodiments using an angular offset in the range of 40 to 50 degrees (with an angle of about 45 degrees shown in FIG. 7).

The mounting system 700 further includes a device support 740 provided by a first support arm 742 and a second support arm (not shown in full) but extending out from end 746. The end 746 of the second support arm is coupled rigidly with the end 744 of the first support arm 742, and the second support arm may extend outward at a 90 degree or other desired angle to orient the surfaces 754, 756 relative to the first and second mounting members 710, 730 (and a user's hand which is engaged by these members 710, 730). The second support arm includes a mounting surface(s) (as discussed with regards to surface 169 of FIGS. 1-6) for attaching the input device 750 to the mounting system 700 and its device support 740.

The device support's first support arm 740 is coupled at a second end 743 with the connector 722 such that the coupling location of the device support 740 coincides with the end 735 of the second mounting member 730, which as discussed above allows this coupling location and the end 743 to be positioned at or just below (palm-side) the area of the palm covering the knuckles (e.g., between the middle and ring finger or where these bones join the corresponding metacarpals). The length of the first support arm 740 may vary but is chosen to provide proper registration of the input device 750 and its surfaces 754, 756 with a user's hand (e.g., may be in the range of 0.5 to 3 inches with 0.75 to 1.5 inches being useful in many applications).

Figure 8:
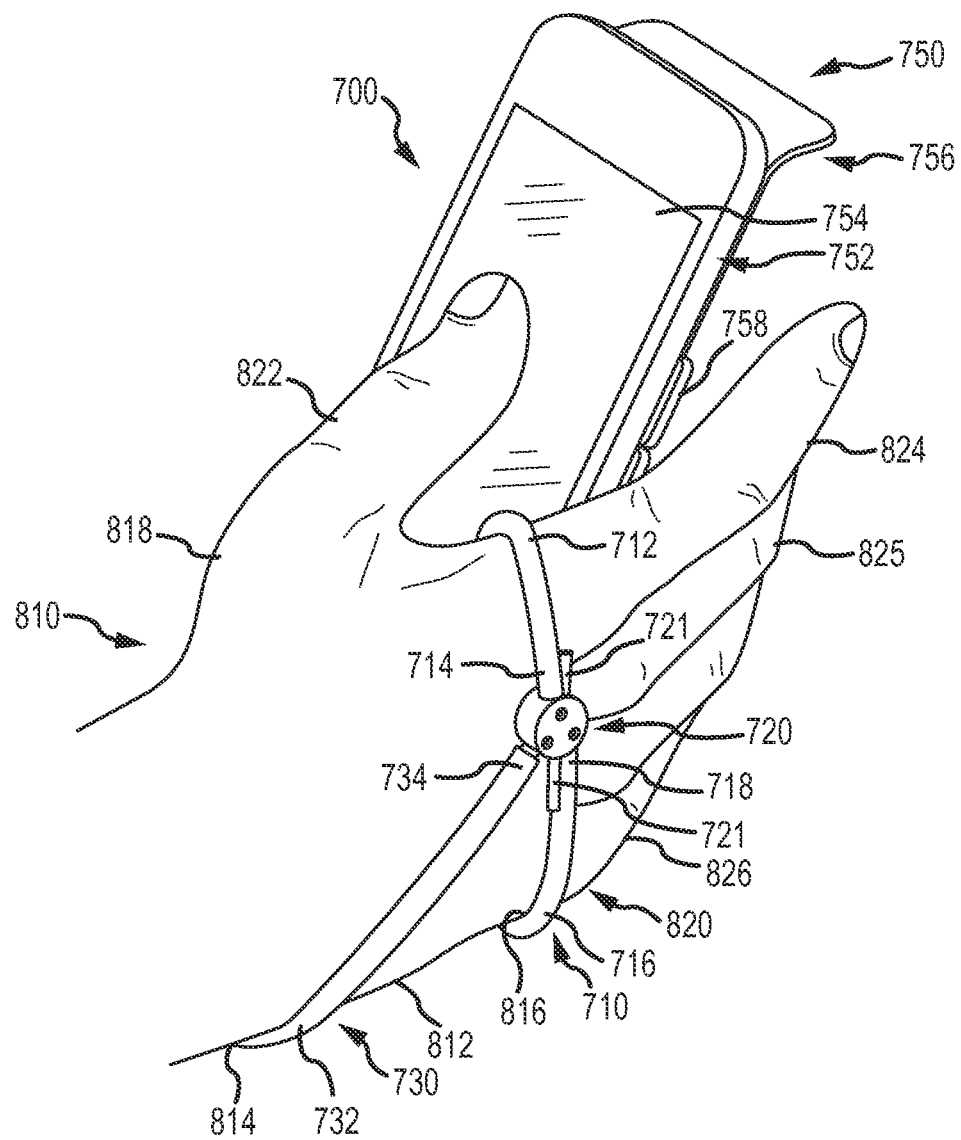
FIG. 8 is a front side perspective view similar to that of FIG. 7 further showing the mounting system being worn by a user/operator, including registration of the front surface and its input elements (e.g., portions of a touchscreen of a smartphone or similar computing device) with the user's thumb to facilitate user input with the thumb.

FIG. 8 illustrates the mounting system 700 with a similar view as provided in FIG. 7 but shows the system 700 being worn on a user's hand 810. The user has slipped their fingers including the fore finger 824, middle finger 825, and pinky finger 826, along with the knuckles 820 portion of the hand body 812, through the opening/hole defined by the first mounting member 710. The thumb 822 is not passed through this opening/hole in the first support member 710 such that a first contact point 816 (between the hand 810 and the mounting system 700) is provided between the tubular member 716 of the first mounting member 710 at a location along an outer part of the hand body 812 on the palm-side (rather than finger side) of the knuckles 820. A second contact point 818 is provided in the portion of the hand body 812 between the thumb 822 and the knuckles 820 (typically closer to the knuckle of the fore finger 824 than to the thumb 822). These contact points 816, 818 may be provided by custom sizing the diameter of the hole/opening in the first mounting member 710 to the size of the user's hand 810 (circumference of the user's hands at or just below the knuckles 820 or other useful location for the contact points)

or by providing connectors 720, 722 that are allow the size to be adjusted once placed on the hand 810.

As the hand 810 moves through the first mounting member 710, the second mounting member 730 is moved into position until the third contact point 814 is achieved between the mounting system 700 and the user's hand 810. As shown in FIG. 8, the third contact point 814 is provided between the tubular member 732 of the second mounting member 730. The location of the contact point 814 is shown to be on the outer portion of the hand body 812 (same side as contact point 816 (but so as to be spaced apart (e.g., at least 1 to 2 inches) to provide stability) and opposite the body 812 from the contact point 818) proximate to the user's wrist such as on or near the heel of the hand 810 or just wrist-side of the heel of the hand 810 (as discussed with reference to FIGS. 1-6).

FIG. 8 illustrates that the surface 754 is registered with the location of the user's thumb 822 and its range of motion to facilitate easy and repeatable (same relative positioning each time the system 700 worn) user input. To this end, the connector 720 (and coupling of the second mounting member 730 with the first mounting member 710) is positioned at a location on the back of the user's hand that is proximate to the knuckles 820 such as a distance (e.g., 0.1 to 0.75 inches) below the knuckles 820 (or distal to the fingers 824, 825) and that may be between the middle finger and the ring finger. The fingers 824, 825 are likewise effectively registered with the locations of the input elements 758 on the back or second surface 756 of the hand-operated input device 750. The user's hand 810 can interact with (press upon) both surfaces 754, 756 and any input elements concurrently or sequentially (independently) without the input device 750 moving (pivoting, rotation, or the like) relative to the user's hand 810.

Figure 9:
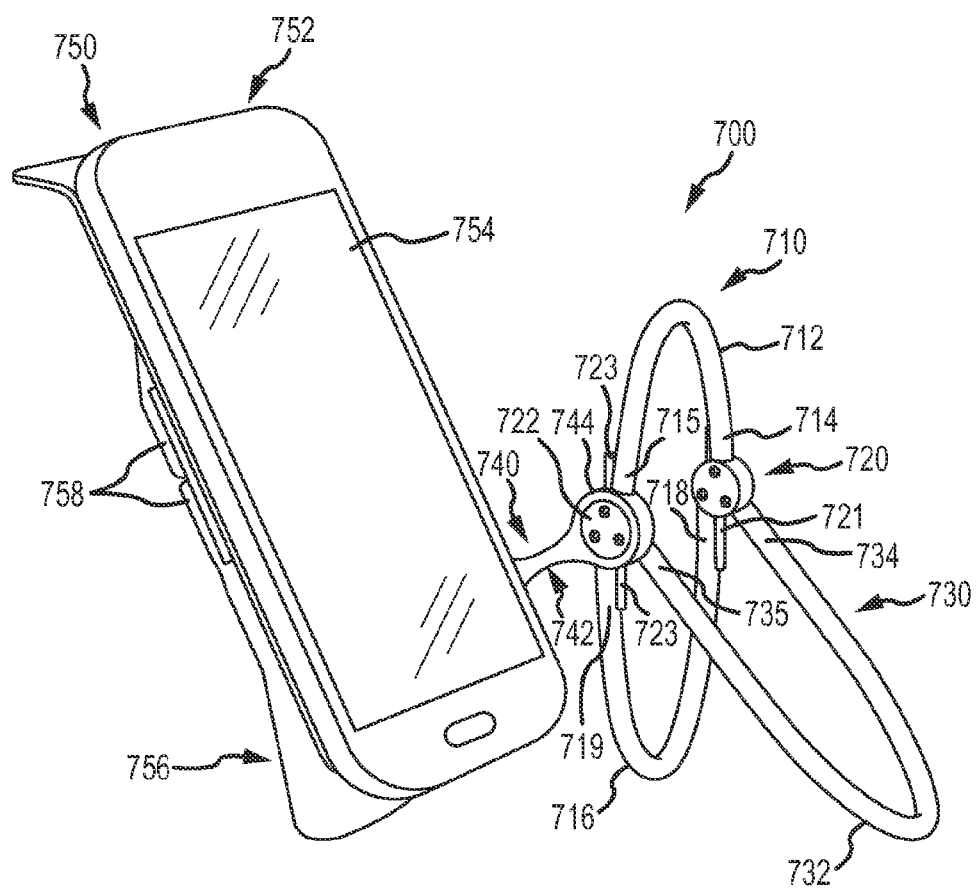
FIG. 9 is a front side perspective view of the mounting system of FIG. 7.
Figure 10:
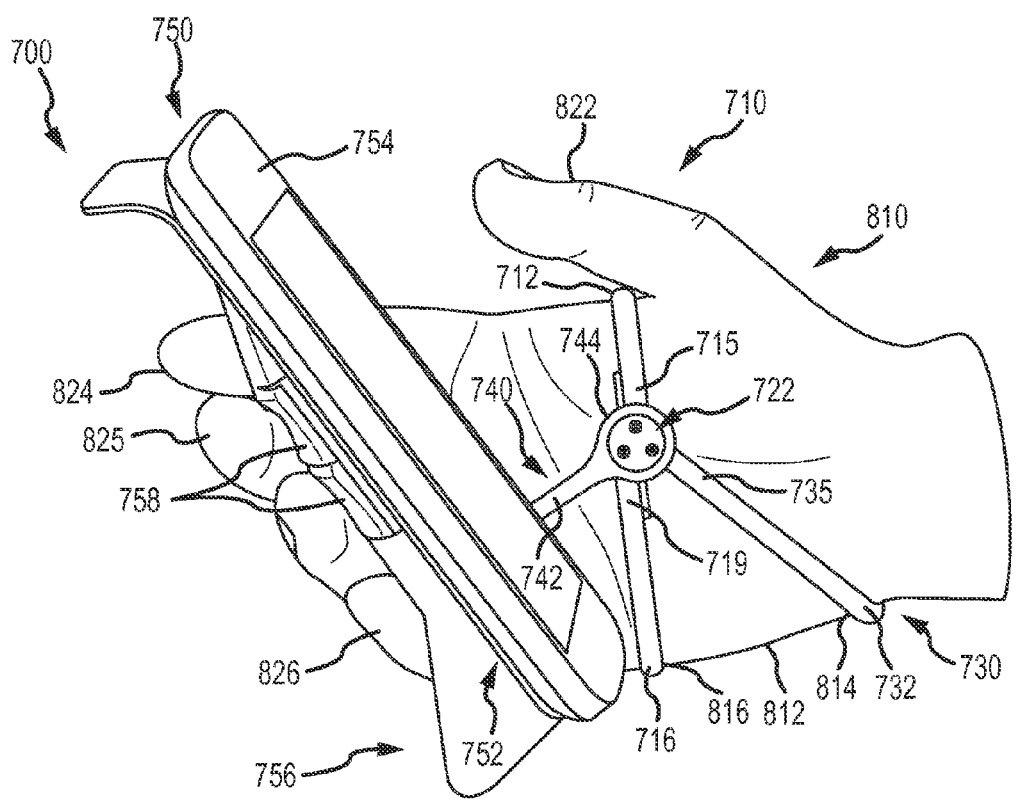
FIG. 10 is side perspective view similar to that of FIG. 9 further showing the mounting system being worn by a user/operator, including registration of the front surface and its input elements (e.g., portions of a touchscreen of a smartphone or similar computing device) with the user's thumb and of the back surface and its input elements (here buttons or triggers are shown but any input elements may be used) with one or more of the user's fingers.

FIG. 9 provides another perspective view of the mounting system 700 of FIG. 7 showing more clearly the first surface 754 of the input device 750 that may be used to provide input elements for interaction with a user (e.g., a GUI for an application or the like). FIG. 10 illustrates the mounting system 700 as shown in FIG. 9 but with a user's hand 810 inserted through the hole/opening in the first mounting member 710 (e.g., with the user wearing the mounting system 700 on their hand 810). Contact points 816 and 814 can be seen in FIG. 10 along the outer side of the body 812 of the hand 810.

Registration of the input device 750 and any input elements on the first and second surfaces 754, 756 is achieved in part by locating the connector 722 (and, hence, the coupling location of the end 735 of the tubular member 732 of the second mounting member 730 and of the first mounting member 710) at a particular location (or range of locations) on the palm of the user's hand 810. This location may be opposite the other connector 720 and between the middle and ring fingers (or the joints of these phalanges with corresponding metacarpals) at an area of the palm over the knuckles 820 (or a distance (0.1 to 0.75 inches) away from the knuckles that is palm side).

As a result, it can be seen that the user can move their thumb 822 to interact with the surface 754 (and its input elements) and move their fingers 824, 825 to interact with the input elements 753 on the surface 756 (which may abut or be in contact with the back surface of the electronic input device 752, which may be a smartphone, a tablet, a computing device, or the like). As shown, the surface 754 is suspended at an angle relative to the plane containing the first mounting member 710 (away from the palm), as this may be useful in properly registering the input elements with the user's thumb 822 and fingers. For example, this offset angle may be about 45 degrees or another useful angle in the range of 30 to 60 degrees, with a particular angle chosen to suit differing hand-operated input devices and/or user's hand shapes/sizes.

It will be recognized by those skilled in the arts that embodiments of mounting systems may be designed and produced in which the mounting system utilizes first and second mounting members that each has a free end (or one has a free end). In other words, one or both of the mounting members may be formed of relatively rigid material (e.g., a wire or rod formed of metal, plastic, or other material to provide a core) that is also somewhat deformable or flexible to allow the size and/or shape to be changed to "fit" or "size" the mounting system to a particular user's hand or to the way they wish for the mounting system to ride on their hand to register or align their hand/fingers with input devices. The particular shape of each of these open-ended (or non-closed loop) mounting members may generally be U-shaped and/or hoop-shaped (or both may be generally U-shaped) as described above but may include additional arches, curves, bends, and the like to provide an ergonomically pleasing lightweight mounting system for a user/operator of a hand-operated input device.

Figure 11:
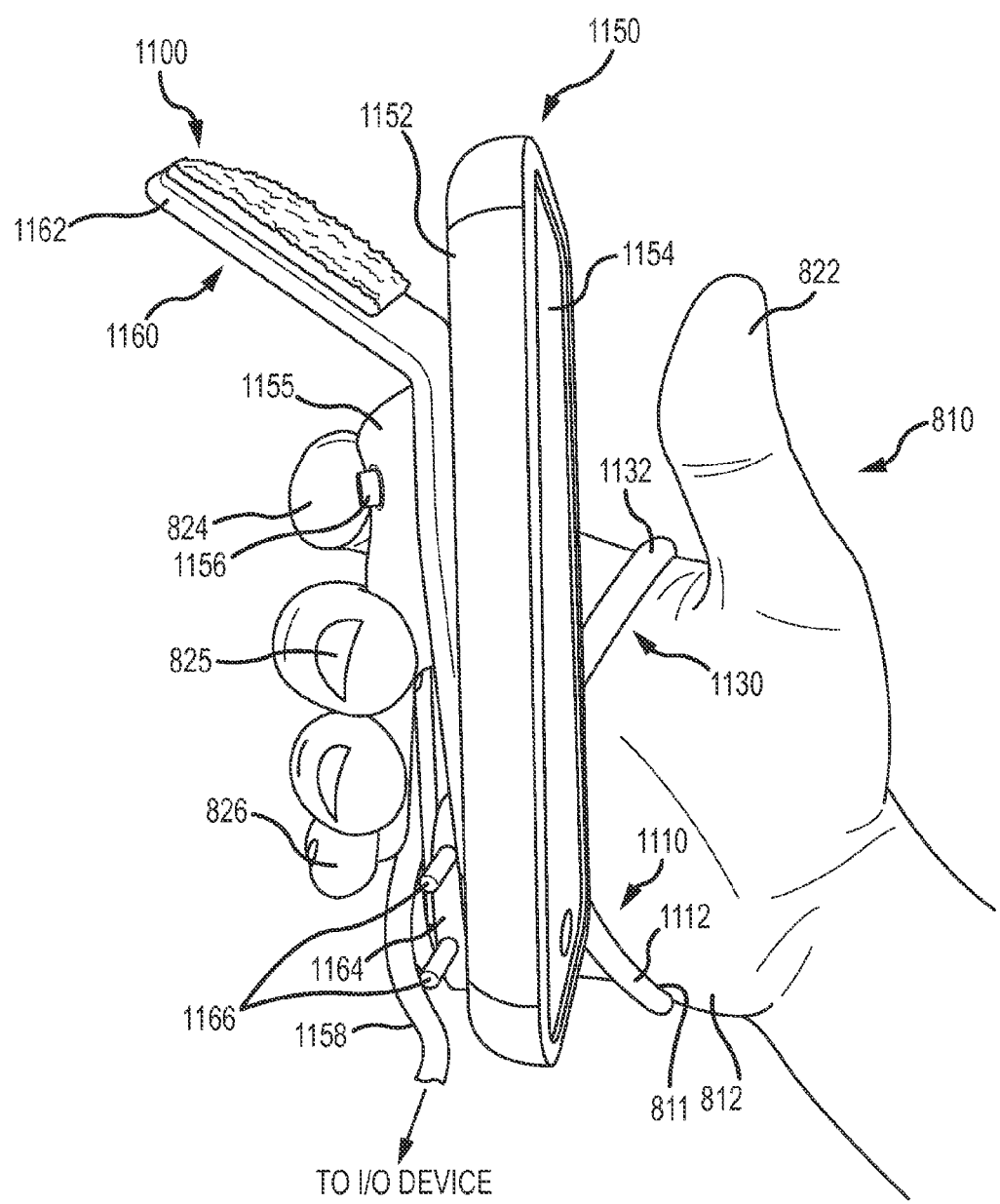
FIG. 11 is a first side view similar to that of FIG. 10 showing another embodiment of a mounting system being worn by a user/operator.
Figure 12:
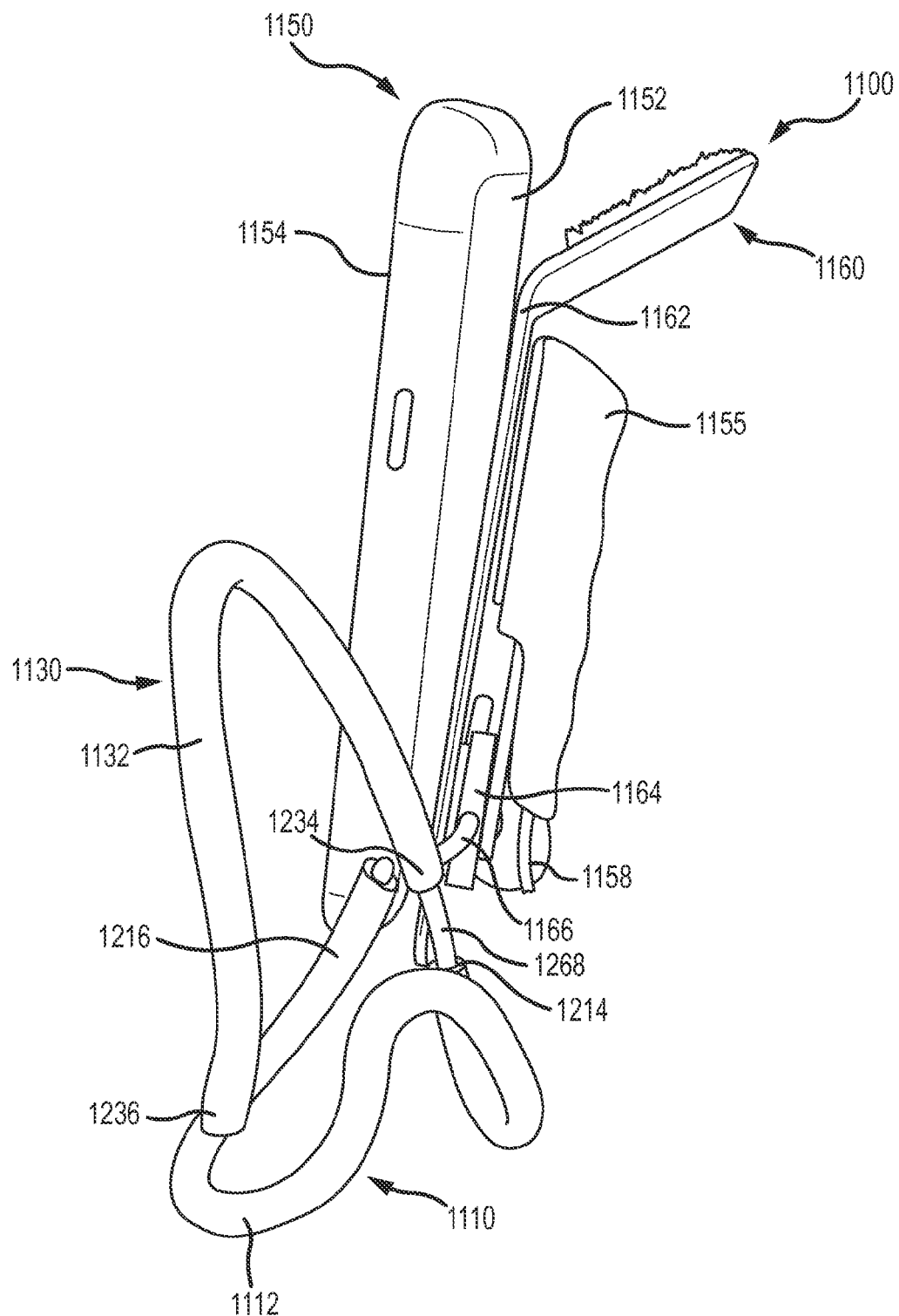
FIG. 12 is a second side view of the mounting system shown in FIG. 11 (but not being worn by a user/operator)
Figure 13:
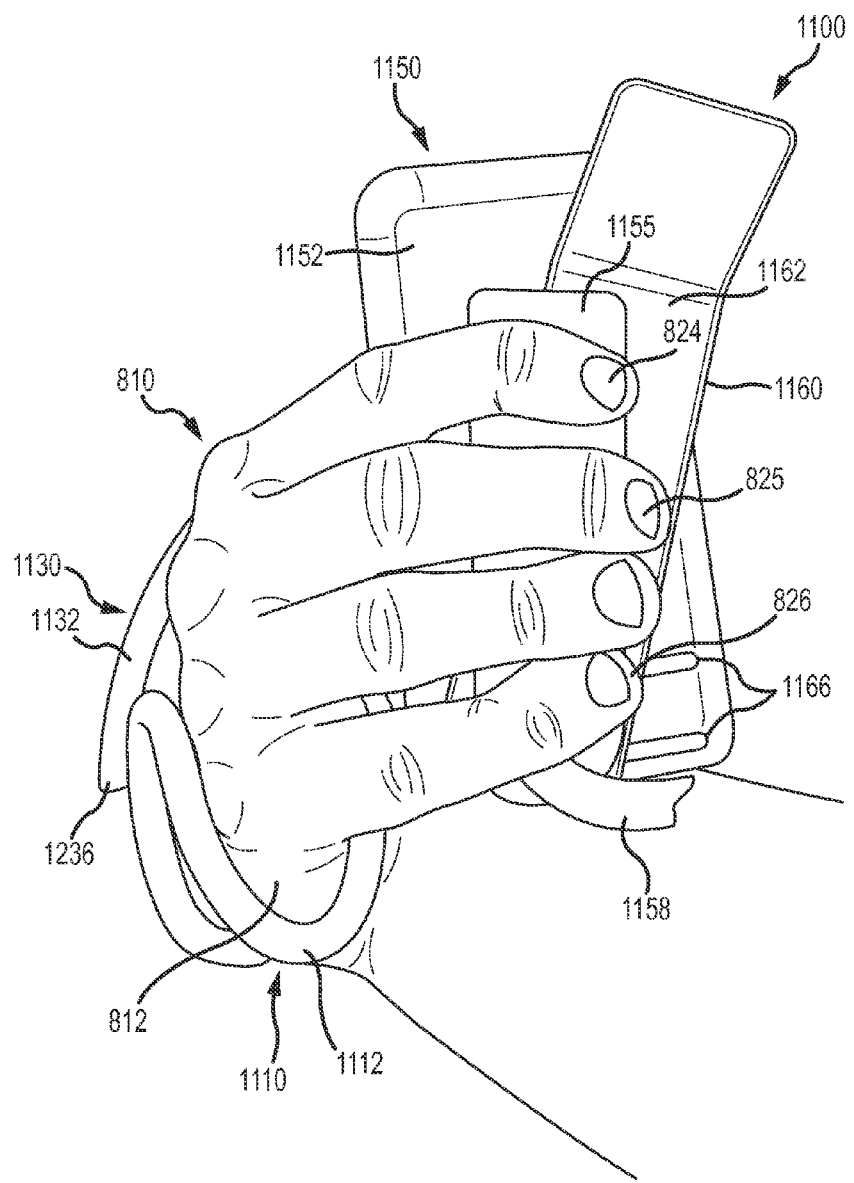
FIG. 13 is a rear view of the mounting system shown in FIG. 11.
Figure 14:
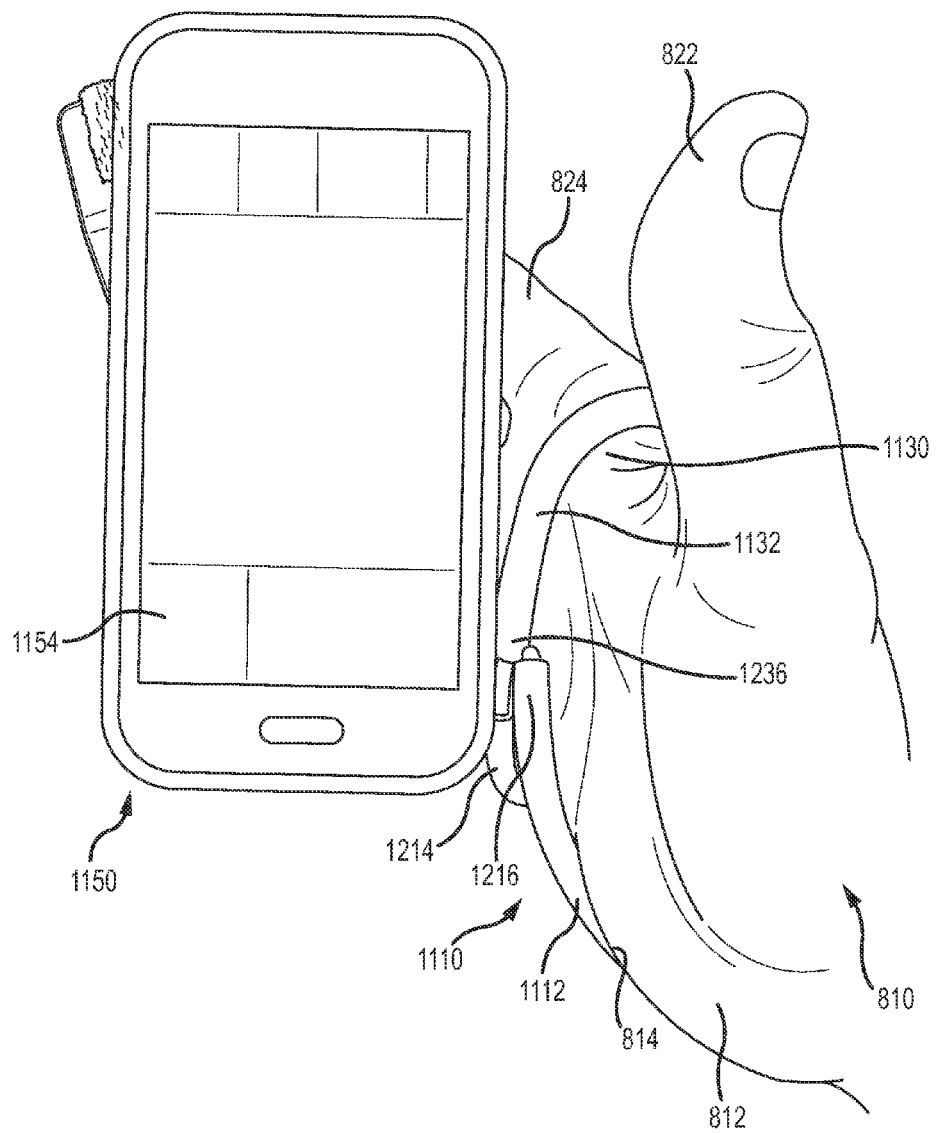
FIG. 14 is a front view of the mounting system shown in FIGS. 11-13.

With this in mind, FIG. 11 is a first side view similar to that of FIG. 10 showing another embodiment of a mounting system 1100 being worn by a user/operator as shown with hand 810. FIG. 12 is a second side view of the mounting system 1100 as shown in FIG. 11 but not being worn by a user/operator in this figure to show additional detail. FIG. 13 is a rear view of the mounting system 1100, and FIG. 14 is a front view of the mounting system 1100.

As shown in FIG. 11, the mounting system includes a first (or lower) mounting member 1110 and a second (or upper) mounting member 1130. The first mounting member 1110 includes a body 1112 that is curved as shown to engage the user's hand body 812 at contact point 814. The second mounting member 1130 includes a body 1132 that is also curved (but typically in a different manner to provide a differently shaped body than body 1112) to extend over the user's hand 810 to contact the hand body 812 at a contact point opposite the first contact point 814 (e.g., opposite side of the user's palm) between the user's thumb 822 and their fore finger 824. The bodies 1112, 1132 may be formed as unitary elements (e.g., rods with circular cross section or the like) or may have two-part configurations as described with regard to the mounting members 130 and 140 of FIG. 1 with tubular body formed of an inner core (e.g., a metal rod or the like) with an outer contact surface layer.

The mounting system 1100 includes a device support 1160 including a mounting plate 1162 for coupling the mounting system and its mounting members 1110, 1130 to a hand-operated input device 1150. The hand-operated input device 1150 may take many forms such as a tablet computing device, a notebook computer, a wireless communication device or smartphone, or the like, and the device 1150 is shown to have a front or input surface (e.g., a touchscreen) 1154 and a back surface/side 1152 (that typically would face away from the user/operator when held in hand 810). The mounting plate is shown to be generally "L" shaped with a planar body adjacent the surface 1152 and a leg or extension extending away from an end of the planar body at an angle (such as up to 100 degrees with about 45 degrees shown in FIG. 11).

The device support 1160 includes coupling member 1164, which may have a circular, relatively thin body, and the coupling member 1164 is adapted for affixing the support plate 1162 to the back surface/side 1152 of the input device 1150 (e.g., with a fastener joining the body of the coupling member 1164 to female receptacle on the back surface 1152 or vice versa). The coupling member 1164 is also adapted for connecting (typically in a rigid manner to limit rotating once mounting/assembly is complete) the mounting members 1110 and 1130 to the input device 1150 as shown, in part, with connector rods/members 1166 extending through and outward from the coupling member 1164.

The support plate 1162 may be used to provide a mounting surface for additional input components of the input device 1150 as shown with input pad/body 1155 that is affixed to the exposed side/surface of the support plate 1162, and one or more input buttons/keys 1156 can be provided on the input pad 1155 to allow easy access to the user via contact with their fingers 824-826. Input provided by operation of the input buttons/keys 1156 may be communicated in a wireless manner in many implementations or may be provided in a wired manner as shown by communication wire/line 1158 (which would be linked to additional I/O devices or controllers/computer linked to or in communication with the hand-operated input device 1150). For ease of use, the input keys/buttons 1156 may be provided opposite the input surface 1154 of the input device 1150 (e.g., thumb 822 is used to interact with screen 1154 while fingers 824-826 are used to interact with the keys/buttons 1156 with the body of the input device 1150 sandwiched in between).

FIG. 12 shows the mounting system 1100 supporting the input device 1150 from the opposite side as shown in FIG. 11 and with the hand 810 of the user/operator removed to show more and/or different details of the design. As shown, the device support 1160 includes the coupling member 1164 attaching the input pad 1155 to the support plate 1162 and the plate 1162 to the back surface/side 1152 of the input device 1150. Further, the device support includes the connector rods/members 1166 that extend outward from the coupling member 1164 and are attached at an end to mounting fixture 1268 (e.g., a T-connector formed of metal, plastic, or the like with receptacle for the ends of the rods/members 1166 and also ends of mounting members 1110, 1130).

The first mounting member 1110 has its body 1112 connected at a first end 1214 (e.g., a portion of the core may be extended out for attachment) to the mounting fixture 1268 with its opposite, second end 1216 unattached or "free" (e.g., free for some amount of movement to size/shape the mounting system 1100 to a user's hand 810). The first mounting member 1110 may generally be U-shaped but is shown to have an arch or upward curve at a point (e.g., midway or toward the center of body 1112) between the ends 1214, 1216 (e.g., a curve that may cause the body 1112 to extend upward from the plane(s) containing ends 1214, 1216 by a distance in the range of 0.5 to 3 inches) such that it may be considered to be more S-shaped than purely U-shaped as shown. The arch or curved portion is used to provide two spaced-apart contact portions of the body 1112 that can be used to engage a user's hand 810 or lower surfaces of its body 812 (e.g., to provide two contact points opposite the user's thumb 822). The ends 1214, 1216 typically are also "above" or in a different plane(s) than the spaced-apart contact portions of the body 1112.

The second mounting member 1130 has its body 1132 connected at a first end 1234 (e.g., a portion of the core may be extended out for attachment) to the mounting fixture 1268 with its opposite, second end 1236 unattached or "free" (e.g., free for some amount of movement to size/shape the mounting system 1100 to a user's hand 810). The second mounting member 1130, which provides a contact surface for the user's hand 810 or its body 812 between the user's thumb 822 and forefinger 824, is shown to be generally U-shaped or arch-shaped with the two ends 1234, 1236 spaced apart a distance great enough to readily receive a user's hand 810 but small enough to provide a relatively snug "fit," but the end 1236 may be moved closer toward the end 1234 after a user's hand 810 is received so as to improve the fit or sizing of the mounting system 1100 for the particular hand 810. For example, the spacing between ends 1234, 1236 may originally be 4 to 6 inches but be reduced as part of fitting operations to 2 to 4 inches or the like, and the "height" of the arch (or depth of the U) may vary to practice the system 1100 but may often be in the range of 3 to 7 inches. As shown, the body 1130 generally extends laterally outward from the side of the support plate 1160, and the free or unattached end 1236 may be located proximate to (e.g., within 1 to 2 inches) of a contact portion of the body 1112 of the first mounting member 1110 (e.g., to better enclose or wrap around the user's hand 810) to restrain movement of the hand body 812 away from the input device 850).

FIGS. 13 and 14 provide, respectively, rear and front views of the mounting system 1100 while it is being used to support the input device 1150 on the user's hand 810. As shown in FIG. 13, the two mounting members 1110 and 1130 act in combination to effectively support, via their connection to the support device 1160, the input device 1150 by providing one to three contact points with the hand body 812 (e.g., over time the contact may be lost temporarily with one of the members 1110, 1130 as the user's moves or may be maintained substantially all the time depending on the tightness of the fit). The user's fingers 824-826 are aligned or easily positionable over the input pad 1155 but are not required to support the device 1150.

As shown in FIG. 14, the mounting members 1110 and 1130 abut or are near the palm of the user's hand 810 between the hand 810 and the input device 1150. The user is able to freely move their thumb 822 relative to the input surface (e.g., touch screen for a smartphone or other input element(s)) 1154, and the location of one or more areas or regions of the surface 1154 can be aligned or registered to where the thumb 822 will swing inward and contact the surface 1154 (e.g., thumb movement can be somewhat limited so as to be predictable relative to the hand body 812 to register a particular input element on the surface 1154 with the user's thumb 822 as it swings into contact). Together, all or portions of the mounting member bodies 1112, 1132 appear to form a hoop (which is nearly closed as end 1216 may (or may not) be spaced apart from the body 1132 of mounting member 1130).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The lightweight mounting systems taught herein are useful for supporting hand-operated input devices in a manner such that these devices are suspended from the user's hand (e.g., from the body of the user's hand such that their thumb and fingers are free and not restrained by the mounting system or by gripping the device). The mounting system is adapted, e.g., through the use of an angled device support, to register one surface of the suspended input device with the user's thumb and one surface (e.g., the opposite surface) with the user's fingers. Input elements/mechanisms can be provided on these two opposite surfaces of the hand-operated input device for ready and repeatable interaction with the user's thumb and fingers (e.g., no look can be provided by picking the input element locations such as buttons, sliders, or the like in corners or in the middle of a touch-screen on one surface of the device). Registration is "repeatable" in that the thumb and fingers are located in the same positions relative to the input device's surfaces and input elements/mechanisms each time the user wears the mounting system and a suspended device.

The mounting system may be custom fit and/or sized for each user and the size and/or shape of their hand such as to provide proper contact between the mounting members and the body of the user's hand and such as to account for the length of the user's fingers (e.g., the length of the second support arm of the device support may have its length chosen to suspend the device and its input elements a desired distance from the user's palm or to "register" the surfaces of the device with the expected interactive configuration of the user's thumb and fingers). The fit is preferably tight enough such that the mounting system along with the hand-operated device do not slip off the user's hand such as when they point their fingers toward the ground/floor. The combination of the mounting members and the three contact points (minimum) and the rigidly coupled device support provides a firm base for allowing the user to press on both sides/opposite surfaces of the hand-operated input device without the device pivoting or rotating.

The contact points between the mounting members and user's hand may be altered to provide a different registration arrangement. For example, a "gunslinger" configuration may be used in which the first mounting member or hoop-shaped mounting member rides lower on the hand, such as adjacent the hinge joints between the bones of the fingers, with its two (or more) contact points at locations on outer portions of the index and pinky fingers. This arrangement or wearing style allows for more movement of the hand-operated input device, but it may require the user to apply forces against the first mounting member to maintain tension and/or to keep the mounting system and suspended device from slipping off the hand.

We claim:

1. An apparatus for supporting a hand-operated input device on a user's hand, comprising:
    a first mounting member with a hoop-shaped body;
    a second mounting member with a semi-circular shaped body having a first end and a second end, wherein the first and second ends are coupled at spaced-apart first and second locations to the hoop-shaped body of the first mounting member, wherein the first and second ends of the second mounting member do not move relative to the first mounting member when the second mounting member is coupled to the first mounting member; and
    a device support rigidly coupled to the hoop-shaped body of the first mounting member,
    wherein the device support is adapted for mating with and supporting the hand-operated input device,
    wherein the device support comprises a first support arm coupled to the first mounting member so that the first end of the first support arm does not rotate and does not move relative to the first mounting member such that a location of coupling between the first support arm and the first mounting member does not change,
    wherein the first support arm extends from a first end outward from the hoop-shaped body of the first mounting member and the device support further comprises a second support arm mating with a second end of the first support arm distal to the hoop-shaped body, the second support arm including a mounting surface extending transverse to the first support arm for receiving and supporting the hand-operated input device and the first support arm having a length defining a distance the hand-operated input device is spaced-apart from the location of coupling between the first support arm and the first mounting member,
    wherein the first end of the first support arm does not rotate or move relative to the first mounting member, and
    wherein, when the apparatus is worn on a hand, the hoop-shaped body of the first mounting member contacts the hand at first and second contact points and the semi-circular shaped body of the second mounting member contacts the hand at a third contact point.

2. The apparatus of claim 1, wherein the length of the first support arm has a length of is at least 0.5 inches.

3. The apparatus of claim 1, wherein the first and second support arms meet at a corner defining an angle in the range of 70 and 110 degrees.

4. The apparatus of claim 1, wherein the first end of the first support arm is coupled to the hoop-shaped body of the first mounting member at the first location.

5. The apparatus of claim 1, wherein the first and second contact points are located on opposite sides of a body of the hand between the knuckles and the heel of the body of the hand and wherein the third contact point is spaced apart from the second contact point, on an opposite side of the body of the hand from the first contact point, and on the heel of the hand.

6. The apparatus of claim 1, wherein the bodies of the first and second support members comprise a stiff inner core formed of plastic or metal and an outer contact surface layer covering the stiff inner core formed of a soft plastic or a rubber.

7. A mounting system for suspending an input device in registered positions relative to a hand, comprising:
    a hoop-shaped first mounting member comprising an inner core and an outer contact surface layer extending over the inner core;
    a U-shaped second mounting member coupled at first and second ends via first and second connectors, respectively to the first mounting member, wherein the second mounting member comprises an inner core and an outer contact surface layer extending over the inner core; and
    a device support coupled to the hoop-shaped body of the first mounting member so that the device support does not rotate and does not move relative to the first mounting member such that a location of coupling between the device support and the first mounting member is retained,
    wherein the device support is adapted for mating with and supporting the input device,
    wherein, when the mount system is worn on the hand, the first mounting member contacts the hand at first and second contact points and the second mounting member contacts the hand at a third contact point,
    wherein first and second connectors are provided for coupling the first and second ends of the second mounting member to the first mounting member so that the first and second ends of the second mounting member do not move relative to the first mounting member, the first and second connectors being attached at spaced-apart first and second locations to the first mounting member so that the first and second connectors do not move relative to the first mounting member, and wherein, when the mounting system is worn on the hand, the first connector is positioned adjacent the back of the hand and to the knuckles of the hand and the second connector is positioned adjacent the palm of the hand opposite the first connector.

8. The system of claim 7, wherein the inner cores comprise metal rods with an outer diameter less than 0.25 inches and the outer contact surface layers comprise a soft plastic or rubber tube.

9. The system of claim 7, wherein the first and second contact points are located on opposite sides of a body of the hand between the knuckles and the heel of the body of the hand and wherein the third contact point is spaced apart from the second contact point, on an opposite side of the body of the hand from the first contact point, and on the heel of the hand.

10. The system of claim 7, wherein the device support comprises a first support arm extending from a first end outward from the first mounting member and a second support arm mating with a second end of the first support arm distal to the first mounting member, the second support arm including a mounting surface for receiving the hand-operated input device.

11. The system of claim 10, wherein the first support arm has a length of at least 0.5 inches.

12. The system of claim 10, wherein the first and second support arms meet at a corner defining an angle in the range of 70 and 110 degrees.

13. The system of claim 10, wherein the first end of the first support arm is coupled to the first mounting member at the first location.

14. An apparatus for supporting an interactive or input device, comprising:
a first mounting member with a hoop-shaped body;
a second mounting member with a semi-circular shaped body having a first end and a second end, wherein the first and second ends are coupled at spaced-apart first and second locations to the hoop-shaped body of the first mounting member so that the first and second ends of the second mounting member are prevented from moving relative to the first mounting member; and
a device support coupled to the hoop-shaped body of the first mounting member so that the device support does not rotate and does not move relative to the first mounting member such that a location of coupling between the device support and the first mounting member is retained, wherein the device support comprises a first support arm extending from a first end outward from the hoop-shaped body of the first mounting member, and a second support arm mating with a second end of the first support arm distal to the hoop-shaped body, the second support arm including a mounting surface extending transverse to the first support arm for receiving the interactive or input device and for supporting the interactive or input device with an orientation that is transverse to the first support arm.

15. The apparatus of claim 14, wherein the first support arm has a length of at least 0.5 inches, wherein the first and second support arms meet at a corner defining an angle in the range of 70 and 110 degrees, and wherein the first end of the first support arm is coupled to the hoop-shaped body of the first mounting member at the first location.

16. The apparatus of claim 14, wherein the bodies of the first and second support members comprise a stiff inner core formed of a metal rod and an outer contact surface layer covering the stiff inner core.

17. The apparatus of claim 16, wherein the outer contact surface layer comprises a rubber tube.

18. An apparatus for supporting a hand-operated input device on a user's hand, comprising:
a first mounting member with a hoop-shaped body;
a second mounting member with a semi-circular shaped body having a first end and a second end, wherein the first and second ends are coupled at spaced-apart first and second locations to the hoop-shaped body of the first mounting member so that the first and second ends of the second mounting member do not move relative to the first mounting member upon assembly and during use of the apparatus; and
a device support coupled to the hoop-shaped body of the first mounting member so that the device support does not rotate and does not move relative to the first mounting member such that a location of coupling between the device support and the first mounting member is retained,
wherein the device support is adapted for mating with and supporting the hand-operated input device,
wherein the bodies of the first and second support members comprise a stiff inner core formed of plastic or metal and an outer contact surface layer covering the stiff inner core formed of a soft plastic or a rubber,
wherein the device support comprises a first support arm extending from a first end outward from the hoop-shaped body of the first mounting member and a second support arm mating with a second end of the first support arm distal to the hoop-shaped body, the second support arm including a mounting surface extending transverse to the first support arm for receiving the hand-operated input device, and
wherein, when the apparatus is worn on a hand, the hoop-shaped body of the first mounting member contacts the hand at first and second contact points and the semi-circular shaped body of the second mounting member contacts the hand at a third contact point.

19. The apparatus of claim 18, wherein the first and second support arms meet at a corner defining an angle in the range of 70 and 110 degrees and wherein the first end of the first support arm is coupled to the hoop-shaped body of the first mounting member at the first location.

20. The apparatus of claim 18, wherein the first and second contact points are located on opposite sides of a body of the hand between the knuckles and the heel of the body of the hand, and wherein the third contact point is spaced apart from the second contact point, on an opposite side of the body of the hand from the first contact point, and on the heel of the hand.

* * * * *